United States Patent [19]

Bojanek et al.

[11] 4,160,876

[45] Jul. 10, 1979

[54] MODULAR MULTIPLEX/DEMULTIPLEX APPARATUS

[75] Inventors: Robert J. Bojanek, Newton; Marvin S. Mason, Lexington, both of Mass.

[73] Assignee: GTE Sylvania Incorporated, Stamford, Conn.

[21] Appl. No.: 901,390

[22] Filed: May 1, 1978

[51] Int. Cl.² ............................................. H04J 3/02
[52] U.S. Cl. ............................................. 179/15 AT
[58] Field of Search ......... 179/15 AT, 15 AQ, 18 FC

[56] References Cited

U.S. PATENT DOCUMENTS

| | | | |
|---|---|---|---|
| 3,637,941 | 1/1972 | Rekiere | 179/15 AQ |
| 4,071,701 | 1/1978 | Leijonhufvud et al. | 179/15 AT |
| 4,092,497 | 5/1978 | Laneau | 179/15 AT |

*Primary Examiner*—Thomas W. Brown
*Attorney, Agent, or Firm*—Peter Xiarhos

[57] ABSTRACT

Modular multiplex/demultiplex apparatus suitable for use in a telephone communication system for processing data transmitted between local and remote telephone subscribers. The multiplex/demultiplex apparatus comprises a plurality of module units which may be interconnected together, for example, in one or more groups, for processing and routing data originating with local subscriber equipment to selected ones of a plurality of trunk group modules and associated modems for transmission to remote subscriber equipment, and for processing and routing data received by the trunk group modules and modems from remote subscriber equipment. Each module unit includes a shift register having a plurality of demultiplex input lines for receiving demultiplexed data thereon and a series input for receiving multiplexed data. Data present on the demultiplex input lines or at the series input is shifted to an output of the shift register. The module unit further includes a plurality of multiplex output lines and associated gates connected to the multiplex output lines and in common to the output of the shift register. One of the multiplex output lines represents a module interconnection line and is connected to the series input of the shift register of an adjacent module unit. Data shifted to the output of the shift register is selectively gated through one of the gates to either the multiplex output line connected to the series input of the shift register of the adjacent module unit or to one of the other multiplex output lines to an associated trunk group module and modem.

11 Claims, 4 Drawing Figures

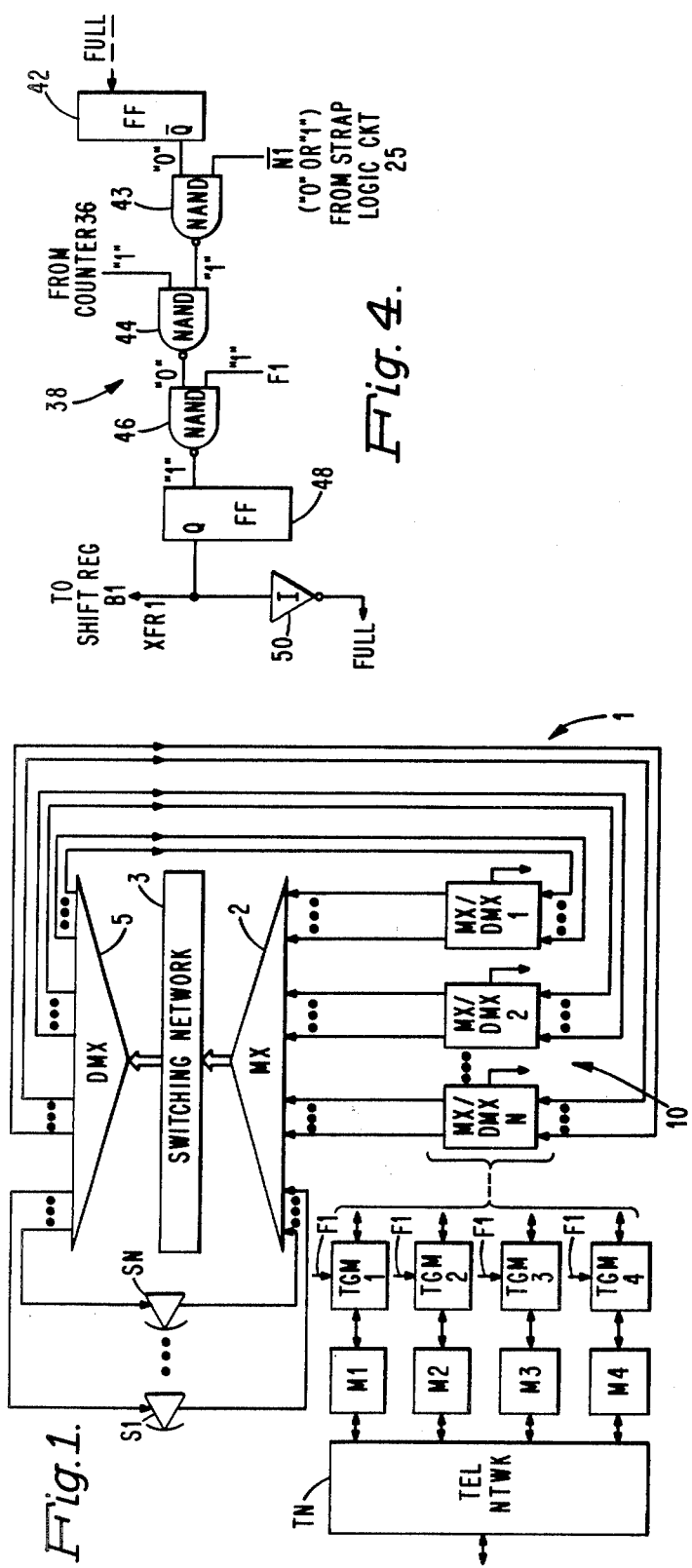
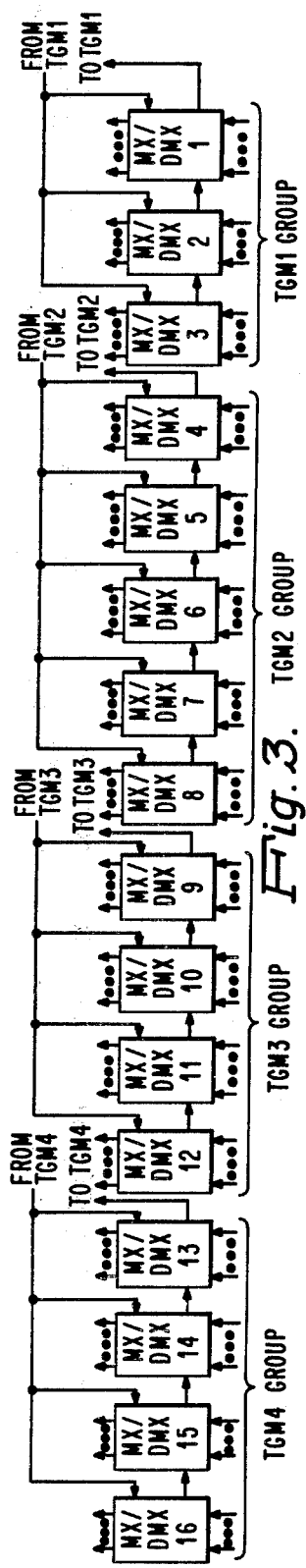
Fig. 1.
Fig. 3.
Fig. 4.

Fig. 2.

MODULAR MULTIPLEX/DEMULTIPLEX APPARATUS

The invention herein described was made in the course of a contract with the Department of the Army.

CROSS-REFERENCE TO RELATED APPLICATION

Ser. No. 901,928 filed concurrently herewith in the names of Robert J. Bojanek and Marvin S. Mason, entitled MODULAR MULTIPLEX/DEMULTIPLEX APPARATUS, and assigned to the same assignee as the present application.

BACKGROUND OF THE INVENTION

The present invention relates to a multiplex/demultiplex apparatus and, more particularly, to a modular multiplex/demultiplex apparatus comprising a plurality of individual module units capable of being interconnected together to provide an apparatus of variable capacity and capable of performing data multiplexing and demultiplexing operations.

In present day telephone communications systems it is well known to establish selective switching and routing connections between telephone subscribers at different locations for enabling these subscribers to communicate with each other. In one approach, groups of subscribers are assigned to corresponding trunk group modules and modems by which the groups of subscribers may be interconnected with subscribers at other locations via the associated trunk group modules and modems. In the above system configuration, data originating with subscribers at one location is generally in a parallel-bit (or demultiplexed) format and is converted to a series-bit (or multiplexed) format and routed to the trunk group modules and modems for transmission to remote subscriber equipment. Similarly, data received by the trunk group modules and modems from the remote subscriber equipment, also in a series-bit (or multiplexed) format, is converted to a parallel-bit (or demultiplexed) format and routed to the local subscriber equipment for utilization thereby.

While the abovedescribed telephone communications systems operate in a generally satisfactory manner, these systems are generally non-modular in nature and, consequently, once the assignment of subscribers to trunk groups modules and modems is established, this assignment cannot be readily and easily altered. Thus, for example, if it is desired to increase or decrease the number of subscribers assigned to a particular trunk group module and modem, this cannot be done without substantial hardware modification (and downtime) of the system. Further, once the subscriber hardware configuration is fixed, a subsequent reduction in the number of subscribers assigned to one or more of the trunk group modules and modems creates an excess-capacity situation and, if the system is not modified to reduce the subscriber hardware content, the system will still provide support or service for the unused capacity despite the fact that subscribers have been removed from and are no longer using the system. An additional disadvantage in this latter situation is that the system will continue to operate in its usual fashion during the time slots formerly used by the previous subscribers and use valuable transmission line time even though no subscriber transmissions are to take place. If it is a requirement of the system, therefore, that the transmission line be used only for actual subscriber transmissions, then the system as described above clearly would not satisfy this requirement.

SUMMARY OF THE INVENTION

In accordance with the present invention, a modular multiplex/demultiplex apparatus is provided which avoids many of the problems as described hereinabove. The multiplex/demultiplex apparatus in accordance with the invention comprises a plurality of multiplex/demultiplex module units arranged in series in a group. Each of the module units comprises a plurality of demultiplex input lines for receiving demultiplexed data thereon. The data on each line is in a serial bit format. The demultiplex input lines are coupled to corresponding ones of a plurality of series-connected stages of a shift register means. The shift register means further includes a series input for receiving data in a multiplexed format. The shift register means operates to shift data applied to the plurality of stages thereof or to its series input serially to an output thereof in a multiplexed format.

The module unit further includes a plurality of multiplex output lines. One of these multiplex output lines represents a module interconnection line and is connected to the series input of the shift register means of the preceding module unit in the series. A plurality of gating means are respectively connected to the plurality of multiplex output lines and in common to the output of the shift register means. Each of the gating means has a first operating state during which multiplexed data at the output of the shift register means may pass therethrough to its corresponding multiplex output line and a second operating state during which multiplexed data at the output of the shift register means is inhibited from passing therethrough to its corresponding multiplex output line. A selection means operates in accordance with the invention to enable a selected one of the aforementioned gating means to operate in its first state thereby to allow multiplexed data at the output of the shift register means to pass therethrough to its associated multiplex output line. Consequently, if the selection means selects the gating means connected to the multiplex output line connected to the series input of the shift register means of the preceding module unit in the series, the data at the output of the shift register means passes through the selected gating means to its associated multiplex output line to the series input of the shift register means of the preceding module unit. If the selection means selects one of the other gating means, the data at the output of the shift register means passes through the selected gating means to its associated multiplex output line.

The module unit as described hereinabove further comprises, as an additional aspect of the invention, a plurality of multiplex input lines adapted to receive multiplexed data thereon. The multiplexed data on each line is in a serial bit format. The aforementioned selection means further operates to cause data in a selected one of the multiplex input lines to be transferred to a second shift register means. The second shift register means, which comprises a plurality of stages connected in series, operates to shift bits of the multiplexed data transferred thereto serially along the stages thereof and to be stored in succession in said stages. A counter means operates to count the bits shifted into and stored in the second shift register means and when the count reaches a predetermined value to produce an output count signal.

A counter circuit means of the module unit is coupled to the counter means, to the second shift register means and to the counter circuit means of the next succeeding module unit in the series. The counter circuit means is designated by a designation means as either the first counter circuit means of the series of module units or as other than the first counter circuit means of the series. When the counter circuit means is designated as the first counter circuit means in the series of module units, it operates in response to the associated counter means producing an output count signal to produce and apply a transfer signal to a storage means coupled to the second shift register means, and to produce and apply a full output signal to the counter circuit means of the next succeeding module unit in the series. When the counter circuit means is designated as other than the first counter circuit means in the series of module units, it operates in response to a full output signal from the counter circuit means of the preceding module unit in the series to produce and apply, upon the occurrence of the next output count signal of the counter means following the receipt by the counter circuit means of the full output signal, a transfer signal to the storage means and a full output signal to the counter circuit means of the next succeeding module unit in the series.

The storage means of each module unit, comprising a plurality of storage locations each coupled to a corresponding one of the plurality of stages of the second shift register means, operates in response to a transfer signal applied thereto to receive the bits of data then stored in the associated second shift register means and to store said bits of data in the storage locations thereof in a demultiplexed format.

A readout means operates to cause the data stored in the storage locations of the storage means to be applied in parallel to a plurality of demultiplex output lines each of which is coupled to a different one of the storage locations of the storage means.

BRIEF DESCRIPTION OF THE DRAWING

Various objects, features and advantages of a modular multiplex/demultiplex apparatus in accordance with the invention will be apparent from the following description taken in conjunction with the accompanying drawing in which:

FIG. 1 is a block diagram of a telephone communication system employing a modular multiplex/demultiplex apparatus in accordance with the present invention;

FIG. 2 is a block diagram of the modular multiplex/demultiplex apparatus in accordance with the invention;

FIG. 3 illustrates a typical arrangement of module units of the multiplex/demultiplex apparatus of the invention; and FIG. 4 is a block diagram of a counter logic circuit employed in each of the module units of the multiplex/demultiplex apparatus of the invention.

DETAILED DESCRIPTION OF THE INVENTION

Referring now to FIG. 1, there is shown a telephone communication system 1 employing a modular multiplex/demultiplex apparatus 10 in accordance with the invention. In the telephone communication system of FIG. 1, a plurality of subscribers Sl-Sn at a first location are able to communicate over a standard telephone network TN with subscribers at another location (not shown). Data originating with the subscribers Sl-Sn, typically in a digital, series-bit format and at a bit rate of 32Khz, is applied to a multiplexer arrangement 2 and time division multiplexed thereby into serial bit streams, for example, at a frequency or bit rate of 2.048 Mhz, and applied to a switching network 3. The switching network 3 operates to connect each multiplexed signal received thereby to a particular input of a demultiplexer arrangement 5 wherein the signal is demultiplexed, for example, into nine parallel bits, and applied to corresponding inputs of a corresponding one of a plurality of multiplex/demultiplex module units MX/DMX1 . . . MX/DMXN provided in the aforementioned multiplex/demultiplex apparatus 10.

Figure 2:
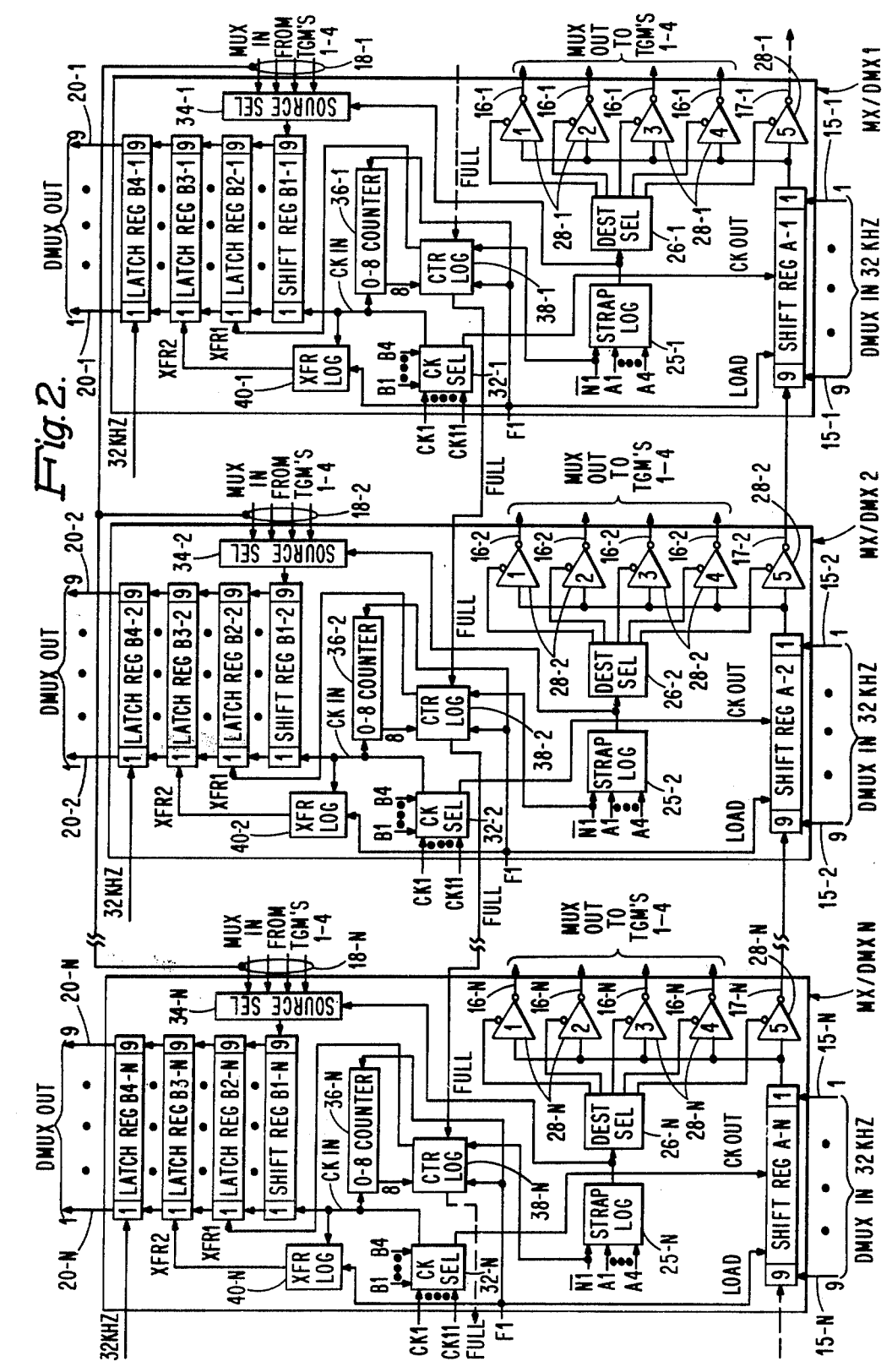

As will be described in greater detail hereinafter in connection with FIGS. 2 and 3, the multiplex/demultiplex module units MX/DMX1 . . . MX/DMXN are individual units of like design and construction and may be interconnected together into one or more groups, for example, as shown in FIG. 3, and selectively assigned on a group basis to a plurality of trunk group modules TGM1-TGM4. A typical maximum number of module units MX/DMX1 . . . MX/DMXN is 16. Each group of module units MX/DMX1 . . . MX/DMXN assigned to a corresponding one of the trunk group modules TGM1-TGM4 is arranged to multiplex the data received thereby from the demultiplexer arrangement 5 and to route the multiplexed data to the associated trunk group module. The data applied to the trunk group module is synchronized with a frame signal F1 and then applied to corresponding modems M1-M4 and transmitted thereby in a standard fashion over the telephone network TN to a remote subscriber location. Although not shown in FIG. 1, the remote subscriber location contains the same apparatus, and operates in the same fashion, as the apparatus shown in FIG. 1.

Data received from the remote subscriber location (in a multiplexed format) is applied to the modems M1-M4 and the associated trunk group modules TGM1-TGM4 and then applied to the various groups of module units assigned thereto. Each group of module units assigned to a particular one of the trunk group modules TGM1-TGM4 operates to demultiplex the data received thereby and to apply the demultiplexed data, comprising nine parallel bits, to the multiplexer arrangement 2. The demultiplexed data is then multiplexed by the multiplexer arrangement 2 and applied to the switching network 3. The switching network 3 operates, in the same manner as earlier described, to establish appropriate paths therethrough for the multiplexed data to the demultiplexer arrangement 5 wherein the data is demultiplexed and applied to the appropriate subscribers Sl-Sn for utilization thereby.

The aforementioned multiplexer arrangement 2, switching network 3, and demultiplexer arrangement 5, although only briefly described hereinabove to illustrate a typical application in which the modular multiplex/demultiplex apparatus 10 may be used, are described in much greater detail in U.S. Pat. No. 3,959,596, in the names of Robert J. Bojanek, Robert G. Field, and Marvin S. Mason, entitled TIME DIVISION SWITCHING NETWORK, and assigned to the same assignee as the present application.

By virtue of the utilization of the multiplex/demultiplex module units MX/DMX1 . . . MX/DMXN as described above, once it is determined how many subscribers are to use the communication system 1 and how they are to be assigned (via the module units MX/DMX1 . . . MX/DMXN) to the trunk group modules TGM1-TGM4, it then becomes necessary only to select as many of the module units MX/DMX1 . . . MX/DMXN as are required to satisfy the subscriber requirements. These module units are then interconnected, in a manner to be described in detail hereinafter, into the particular groups to be assigned to the particular trunk group modules, for example, as indicated in FIG. 3, and then connected to the appropriate trunk group modules. If the subscriber capacity requirements of the system should later change, it then becomes necessary only to add new module units or remove existing module units to accommodate the changed requirements, both of the above changes being quickly and easily accomplished. Thus, there is no need to provide substantial support or service for unused or excess capacity or to utilize substantial valuable transmission time when no actual transmissions are to take place. In addition, and as will also be described in detail hereinafter, the various groups of module units MX/DMX1 . . . MX/DMXN may operate at the same or different frequencies, each of the groups further being capable of operating at one of several different possible frequencies.

Referring now to FIG. 2, the module units MX/DMX1 . . . MX/DMXN are shown in greater detail. In FIG. 2, like components of the module units are indicated by the same generic reference numerals with appended numerals being used to distinguish the particular module units from each other.

As previously indicated, the module units MX/DMX1 . . . MX/DMXN are adapted to be assigned to the trunk group modules TGM1-TGM4 and are interconnected with each other so as to process data for application to the trunk group modules to which they are assigned and also to process data as received from the trunk group modules. The data which is to be processed for application to the trunk group modules TGM1-TGM4 is in a demultiplexed format, for example, as received from the demultiplexer arrangement 5 of FIG. 1 and having a typical bit rate of 32Khz, and is applied simultaneously and in parallel to a plurality of demultiplex input lines 15 of the module units MX/DMX1 . . . MX/DMXN. Each of the module units typically has nine demultiplex input lines 15 as indicated in FIG. 2. After being processed by the module units, in a manner to be described hereinafter, the processed data is presented serially in a multiplexed format at selected ones of a plurality of multiplex output lines 16 and 17 for either direct application to the trunk group modules TGM1-TGM4 to which the module units MX/DMX1 . . . MX/DMXN are assigned, or indirect application through adjacent module units (via the lines 17). The data which is received from the trunk group modules TGM1-TGM4 for processing by the module units MX/DMX1 . . . MX/DMXN is in a serial multiplexed format and is applied in common to multiplex input lines 18 of the module units MX/DMX1 . . . MX/DMXN. After being processed by the module units, in a manner also to be described hereinafter, this data is presented in a demultiplexed format, for example, in a nine parallel bit format, at a plurality of demultiplex output lines 20 for application to output apparatus such as the aforementioned multiplexer arrangement 2 of FIG. 1.

The module units MX/DMX1 . . . MX/DMXN as described above may be interconnected in one or more groups with each group being assigned to a corresponding one of the trunk group modules TGM1-TGM4. FIG. 3 illustrates an example of how a number of module units MX/DMX1 . . . MX/DMXN, for example, 16 module units, may be interconnected together in different groups for assignment to different ones of the trunk groups modules TGM1-TGM4. In FIG. 3, the first three module units (MX/DMX1 . . . MX/DMX3) are shown as being connected together for supplying data to and receiving data from the trunk group module TGM1; the next five module units (MX/DMX4 . . . MX/DMX8) are shown as being connected together for supplying data to and receiving data from the trunk group module TGM2; the next four module units (MX/DMX9 . . . MX/DMX12) are shown as being connected together for supplying data to and receiving data from the trunk group module TGM3; and the last four module units (MX/DMX13 . . . MX/DMX16) are shown as being connected together for supplying data to and receiving data from the trunk group module TGM4. Since each of the module units MX/DMX1 . . . MX/DMX16 has nine demultiplex input channels or lines 15 (FIG. 2) and nine demultiplex output channels or lines 20 (FIG. 2), each of which may be utilized by a different subscriber, the number of subscribers which may be assigned to each of the trunk group modules TGM1-TGM4 in the example of FIG. 3 is 27(9×3, for TGM1), 45(9×5, for TGM2), 36(9×4, for TGM3) and 36(9×4, for TGM4), representing a total of 144(16×9) subscribers.

It is to be understood that the arrangement and assignment of module units MX/DMX1 . . . MX/DMX16 as shown in FIG. 3 is exemplary only and that many other arrangements and assignments are possible. Thus, it is possible to arrange the module units MX/DMX1 . . . MX/DMX16 in groups of any desired size, each containing from 0 to 16 module units, and to variously assign these groups to the trunk group modules TGM1-TGM4, the only requirement being that the module units in each group be connected together in series as shown in FIG. 3. In addition, it is possible for the groups of module units MX/DMX1 . . . MX/DMX16 to be assigned to the trunk group modules TGM1-TGM4 in any desired sequence (e.g., the first five module units to TGM3, the next six module units to TGM1, etc.).

The manner in which the module units MX/DMX1 . . . MX/DMXN may be interconnected together and assigned to the trunk group modules TGM1-TGM4 is shown in FIG. 2. Each of the module units MX/DMX1 . . . MX/DMXN includes a strap logic circuit 25, a destination selector 26 and a plurality of driver or gate circuits 28. The first four driver circuits 28 are connected to the multiplex output lines 16 to which the trunk group modules TGM1-TGM4 are connected, and the last (fifth) driver circuit 28 is coupled to a line 17 which interconnects the particular module unit with the preceding module unit in a group. The strap logic circuit 25 has a plurality of strap inputs N1 and A1-A4 which are adapted to be selectively placed at ground potential or a specified value of voltage to derive a binary-encoded signal at the output of the strap logic circuit 25 identifying the particular driver circuit 28 and associated multiplex output line 16, 17 to receive data processed within the module unit for application to one of the trunk group modules TGM1-TGM4 or the preceding module unit in the series. Thus, for example, if it is desired to apply the data processed within the module unit to the trunk group module TGM3, as might occur, for example, in the case of the first module unit in a group of module units assigned to the trunk group module TGM3 (e.g., see FIG. 3), each of the input straps of the strap logic circuit 25 is placed at either ground potential or other voltage to produce a binary-encoded output signal at the output of the strap logic circuit 25 identifying the third driver circuit 16 and, therefore, the trunk group module TGM3. In this case, the destination selector 26 decodes the binary output signal from the strap logic circuit 25 and enables the third driver circuit 28 while inhibiting the remaining driver circuits 28. With the third driver circuit 28 enabled, demultiplexed data at the demultiplex input lines 15 is loaded into a shift register A, comprising nine series-connected stages, and clocked out therefrom in a serial, multiplexed format to the enabled third driver circuit 28 and then to the trunk group module TGM3.

If it is desired to connect the particular module unit to the preceding module unit in a group, as might occur, for example, in the case of a module unit following the first module unit in a group (e.g., see FIG. 3), each of the input straps of the strap logic circuit 25 is placed either at ground potential or other voltage to produce a binary-encoded signal at the output of the strap logic circuit 25 identifying the last (fifth) driver circuit 28. In this case, the destination selector 26 decodes the binary-encoded signal and enables the last (fifth) driver circuit 28 while inhibiting the remaining driver circuits 28. With the fifth driver circuit 28 enabled, the demultiplexed data applied to the demultiplex input lines 15 loaded into the shift register A is clocked out therefrom in a serial, multiplexed format to the enabled fifth driver circuit 28 and then to the shift register A of the preceding module unit. It will be appreciated that in the case of several module units being connected together in a group, data may be shifted serially, via the shift registers A, from one module unit to the preceding module unit (e.g., see FIG. 3).

The demultiplexed data applied to the demultiplex input lines 15 of the module units MX/DMX1 ... MX/DMXN as described hereinabove is loaded into the shift registers A of the module units by means of a frame signal F1 and clocked out serially from the shift registers A to one of the driver circuits 28 by means of clock signals CKOUT. The frame signal F1 occurs once during a frame wherein the frame comprises a plurality of successive time slots each dedicated to a different one of the module units MX/DMX1 ... MX/DMXN. Thus, for example, for a total number of module units and time slots of 16, each time slot comprising nine channels or lines and having a duration of 1.95 microseconds, the frame signal F1 occurs once each 31.25 microseconds (16×1.95). The data entered into the shift registers A is clocked out therefrom between successive frame signals F1 by means of the aforementioned clock signals CKOUT. The frequency of the clock signals CKOUT applied to the shift register A of each module unit is selected by means of a clock selector 32 coupled to the shift register A. The clock selector 32 receives a plurality (e.g., 11) input clock signals CK1–CK11 of different frequencies (e.g., 11 frequencies) and selects one of these frequencies in response to a four-bit frequency-selection code applied to inputs B1–B4 of the clock selector 32 specifying the desired frequency. By employing the above frequency selection technique, the module units of the different groups of module units assigned to the various trunk group modules TGM1–TGM4 may be made to operate at different frequencies, if so desired.

To process multiplexed data as received from the trunk group modules TGM1–TGM4 to which the module units MX/DMX1 ... MX/DMXN are assigned, the multiplexed data is applied in common to the multiplex input lines 18 of the module units MX/DMX1 ... MX/DMXN. This data is applied from the lines 18 of each module unit to a source selector 34. The source selector 34 also receives the binary-encoded signal from the output of the strap logic circuit 25 specifying the particular multiplex input line 18 associated with the trunk group module to which the module unit is assigned, and operates in response to this signal to allow passage therethrough of only the multiplexed data originating from the particular trunk group module to which the module unit is assigned. In this fashion, the module unit is able to process only data for use by, and originating with, the trunk group module to which it is assigned.

The multiplexed data passing through the source selector 34 is applied to the input of a shift register B1, comprising nine series-connected stages, and clocked serially therein by means of a clock signal CKIN. The clock signal CKIN is derived from the aforedescribed clock selector 32 and is of the same frequency as the aforedescribed clock signal CKOUT. The clock signal CKIN may represent, for example, an inversion of the clock signal CKOUT. By employing the two clock signals CKIN and CKOUT of the same frequency, the clocking of data into the shift register B1 during demultiplexing operations is synchronized with the clocking of data out of the shift register A during multiplexing operations.

As the data from the source selector 34 is clocked into the shift register B1, a counter 36 is enabled by the aforementioned frame signal F1 and clocked upwardly in count by the clock signal CKIN, from a count of zero to a count of eight, to record or count the number of bits (nine) clocked into the shift register B1. When the count in the counter 36 reaches eight, indicating that the shift register B1 is full, this count is detected by a counter logic circuit 38. The counter logic circuit 38, to be described in greater detail hereinafter in connection with FIG. 4, also receives the aforementioned frame signal F1, an input from the $\overline{N1}$ strap of the strap logic circuit 25, and, with the exception of the last module unit in a group of module units, a FULL signal from the preceding module unit. The $\overline{N1}$ strap is made to have a binary "0" value in the case of a module unit which is the first in a group of module units (e.g., such as the module units MX/DMX1, MX/DMX4, MX/DMX9 and MX/DMX13 in FIG. 3) and to have a binary "1" value for all other module units in the same group. In this fashion, the counter logic circuit 38 in the first module unit of a group does not require a FULL input from a preceding module unit whereas the counter logic circuits 38 in the other module units in the same group do.

In the case of the first module unit of a group, the counter logic circuit 38 operates in response to the eight count of the counter 36, corresponding to the first set of nine bits of multiplexed data, the $\overline{N1}=0$ input from the $\overline{N1}$ strap of the strap logic circuit 25, and the frame signal F1, to produce an XFR1 signal and a FULL output signal. The XFR1 signal is applied to a nine-stage latch register B2 of the module unit and causes the data (nine bits) in the shift register B1 to be transferred in parallel in a demultiplexed format to the latch register B2 and stored therein. The FULL output signal is applied to the counter logic circuit 38 of the next module unit in the group. As will be discussed more fully hereinafter in connection with FIG. 4, this FULL output signal is caused to be delayed by the counter logic circuit 38 in the next module unit, for example, by one-half bit period, so that the FULL output signal is not utilized at the occurrence of the present eight count of the counter 36 of the next module unit but, rather, on the next eight count of the counter 36 corresponding to the next set of nine bits of multiplexed data stored in the shift register B1 of that module unit. Upon the occurrence of the next eight count of the counter 36, together with the aforementioned frame signal F1 and the $\overline{N1}=1$ input from the $\overline{N1}$ strap of the strap logic circuit 25, the counter logic circuit 38 operates to produce an XFR1 signal and a FULL output signal. As in the case of the first module unit in the group, the XFR1 signal is employed to transfer the data (nine bits) in the shift register B1 of the module unit to the latch register B2, and the FULL output signal is applied to the counter logic circuit 38 of the next module unit. The counter logic circuit 38 of the next module unit operates in response to the FULL output signal in the same manner as described hereinabove. It is to be appreciated, therefore, that successive nine-bit sets of multiplexed data are stored in succession in the shift registers B1 of the successive module units in a group and transferred in succession (by XFR1 signals) to the latch registers B2 in the module units.

Following the abovedescribed transfer of nine-bit sets of data from the shift registers B1 to the latch registers B2, on the next frame signal F1, the data in the latch registers B2 is transferred simultaneously and in parallel to corresponding nine-stage latch registers B3 and stored therein. This transfer operation is accomplished by transfer logic circuits 40 each of which is arranged to receive the frame signal F1 and the clock signal CKIN and in response thereto to produce an XFR2 signal which is applied to the latch register B3 of the associated module unit to effectuate the transfer of the data stored therein to the latch register B3. Each of the transfer logic circuits 40 may be implemented by a simple flip-flop.

The sets of data stored in the latch registers B3 as discussed above is loaded into associated nine-stage latch registers B4 by means of clock pulses, for example, at a 32Khz rate, applied to the latch registers B4. As a result, the nine-bit sets of data in the latch registers B4 become available in a demultiplexed format at the associated set of demultiplex output lines 20. The data at the multiplex output lines 20 may then be used, for example, by the multiplexer arrangement 2 of FIG. 1 as previously described.

The apparatus as described hereinabove for processing data between the multiplex input terminals 18 and the demultiplex output terminals 20 is also described, and claimed, in the aforementioned co-pending application of Robert J. Bojanek and Marvin S. Mason.

Referring now to FIG. 4, there is shown in detail the counter logic circuit 38 as employed in each of the module units MX/DMX1 . . . MX/DMXN. As shown in FIG. 4, the counter logic circuit 38 includes a flip-flop 42 to which a FULL output signal from a preceding module unit may or may not be applied depending on whether the counter logic circuit 38 is part of a first module unit in a group or part of a subsequent module unit in the group. In either event, the flip-flop 42 operates to produce a 0 binary signal at a $\overline{Q}$ output thereof which is applied to a first input of a NAND logic gate 43. A second input of the NAND logic gate 43 receives the $\overline{N1}$ signal which, as previously mentioned, has either a binary 0 value (for the first module unit in a group) or a binary 1 value (for a module unit other than the first module unit of a group). In either case, since the second input of the NAND logic gate 42 has a binary 0 signal applied thereto, the NAND logic gate 42 produces a binary 1 signal at its output.

A second NAND logic gate 44 receives the binary 1 output from the NAND logic gate 42 and also a binary 1 signal from the counter 36 representing the eight count of the counter 36. It will be noted that since the flip-flop 42 effectively delays the FULL signal, for example, by one-half bit period, the binary 1 output signal of the NAND logic gate 43 does not occur simultaneously with the first binary 1 signal received from the counter 36 following the application of the FULL signal to the flip-flop 42 but rather the next binary 1 signal from the counter 36. Upon the occurrence of the next binary 1 signal from the counter 36, the NAND logic gate 44 operates to produce a binary 0 signal at its output. A third NAND logic gate 46 receives the binary 0 signal from the NAND logic gate 44 together with the frame signal F1 which, as indicated in FIG. 4, is at a binary 1 level. The NAND logic gate 46 accordingly produces a binary 1 output signal which is then used to set a second flip-flop 48. When in its set state, the flip-flop 48 produces an output signal at an output Q thereof which is employed as a transfer signal XFR1. This signal is then inverted by an inverter 50 to produce a FULL output signal for application to the counter logic circuit 38 of the next module unit.

As a variation of the multiplex/demultiplex apparatus 10 shown in FIG. 2 and described hereinabove, it is possible in the situation where the module units MX/DMX1 . . . MX/DMXN are all connected in a single group to couple the FULL output signal of the last module unit to the input of the first module unit and, similarly, to couple the multiplex output line 17 of the first module unit to the input of the shift register A of the last module unit. In this fashion, the module units MX/DMX1 . . . MX/DMXN may be made to operate in a continuous ring-like fashion rather than in a strictly linear fashion as generally indicated in FIG. 2.

While there has been described what is considered to be a preferred embodiment of the invention, it will be apparent to those skilled in the art that various changes and modifications may be made therein without departing from the invention as called for in the appended claims.

What is claimed is:

1. A modular multiplex/demultiplex apparatus, comprising:
   a plurality of multiplex/demultiplex module units, each comprising:
      a plurality of demultiplex input lines for receiving demultiplexed data thereon, the data on each line being in a serial bit format;
      shift register means having a plurality of stages connected in series and each coupled to a different one of the plurality of demultiplex input lines, a series input for receiving data in a multiplexed format, and an output, said shift register means being operative to shift data applied to the plurality of stages thereof or to the series input thereof serially to the output thereof in a multiplexed format;

a plurality of multiplex output lines, one of said multiplex output lines representing a module interconnection line and being connected to the series input of the shift register means of an adjacent module unit;

a plurality of gating means each connected to a different one of the plurality of multiplex output lines and connected to the output of the shift register means, each of said gating means having a first operating state during which multiplexed data at the output of the shift register means may pass therethrough to its corresponding multiplex output line and a second operating state during which multiplexed data at the output of the shift register means is inhibited from passing therethrough to its corresponding multiplex output line; and selection means operative to enable a selected one of the gating means to operate in its first state to allow multiplexed data at the output of the shift register means to pass therethrough to its associated multiplex output line, whereby if the selection means selects the gating means connected to the multiplex output line connected to the series input of the shift register means of the adjacent module unit the data at the output of the shift register means passes through the selected gating means to its associated multiplex output line to the series input of the shift register means of the adjacent module unit, and whereby if the selection means selects one of the other gating means the data at the output of the shift register means passes through the selected gating means to its associated multiplex output line.

2. A modular multiplex/demultiplex apparatus in accordance with claim 1 wherein the selection means of each module unit comprises:

circuit means operable to produce a coded signal designating a particular one of the plurality of gating means to be enabled to pass therethrough multiplexed data at the output of the shift register means; and destination selector means coupled to the circuit means and operative to decode the coded signal produced by the circuit means and to produce a signal for enabling the particular gating means designated by the circuit means.

3. A module multiplex/demultiplex apparatus in accordance with claim 2 wherein:

the shift register means of each module unit further has a clock input for receiving input clock pulses for shifting data applied to the shift register means to the output of the shift register means, the input clock pulses being of the same frequency for all shift register means interconnected serially in a group by means of module interconnection multiplex output lines so that data passes serially through the shift register means of the group.

4. A modular multiplex/demultiplex apparatus in accordance with claim 3 wherein:

the input clock pulses are of a first frequency for a first plurality of shift register means interconnected serially in a first group by means of module interconnection multiplex output lines so that data passes serially through the shift register means of the group; and the input clock pulses are of a second, different frequency for a second plurality of shift register means interconnected serially in a second group by means of module interconnection multiplex output lines so that data passes serially through the shift register means of the group.

5. A modular multiplex/demultiplex apparatus comprising:

a plurality of multiplex/demultiplex module units arranged in series in a group, each module unit comprising:

a plurality of demultiplex input lines for receiving demultiplexed data thereon, the data on each line being in a serial bit format;

first shift register means having a plurality of stages connected in series and each coupled to a different one of the plurality of demultiplex input lines, a series input for receiving data in a multiplexed format, and an output, said first shift register means being operative to shift data applied to the plurality of stages thereof or to the series input thereof serially to the output thereof in a multiplexed format;

a plurality of multiplex output lines, one of said multiplex output lines representing a module interconnection line and being connected to the series input of the first shift register means of the preceding module unit in the series;

a plurality of gating means each connected to a different one of the plurality of multiplex output lines and connected to the output of the first shift register means, each of said gating means having a first operating state during which multiplexed data at the output of the first shift register means may pass therethrough to its corresponding multiplex output line and a second operating state during which multiplexed data at the output of the first shift register means is inhibited from passing therethrough to its corresponding multiplex output line;

selection means operative to enable a selected one of the gating means to operate in its first state to allow multiplexed data at the output of the first shift register means to pass therethrough to its associated multiplex output line, whereby if the selection means selects the gating means connected to the multiplex output line connected to the series input of the first shift register means of the preceding module unit in the series the data at the output of the first shift register means passes through the selected gating means to its associated multiplex output line to the series input of the first shift register means of the preceding module unit, and whereby if the selection means selects one of the other gating means the data at the output of the first shift register means passes through the selected gating means to its associated multiplex output line;

a plurality of multiplex input lines for receiving multiplexed data thereon, the multiplexed data on each line being in a serial bit format;

second shift register means comprising a plurality of stages connected in series;

said selection means being further operative to cause data on a selected one of the multiplex input lines to be transferred to the second shift register means;

said second shift register means being operative to shift bits of the multiplex data transferred thereto serially along the stages thereof and to be stored in succession in said stages;

counter means operative to count the bits shifted into and stored in the second shift register means and when the count reaches a predetermined value to produce an output count signal;

storage means having a plurality of storage locations each coupled to a corresponding one of the plurality of stages of the second shift register means;

counter circuit means coupled to the counter means, to the second shift register means and to the counter circuit means of the next succeeding module unit in the series;

designation means designating the counter circuit means as the first counter circuit means of the series of module units or as other than the first counter circuit means of the series;

said counter circuit means being operative when designated by the designation means as the first counter circuit means in the series of module units and, in response to the counter means producing an output count signal, to produce and apply a transfer signal to the storage means and to produce and apply a full output signal to the counter circuit means of the next succeeding module unit in the series, and said counter circuit means being operative when designated by the designation means as other than the first counter circuit means in the series of module units and, in response to a full output signal from the counter circuit means of the preceding module unit in the series, to produce and apply, upon the occurrence of the next output count signal of the counter means following the receipt by the counter circuit means of the full output signal, a transfer signal to the storage means and a full output signal to the counter circuit means of the next succeeding module unit in the series;

each storage means of a module unit being operative in response to a transfer signal being received thereby to receive the bits of data then stored in the associated second shift register means and to store said bits of data in the storage locations thereof in a demultiplexed format;

a plurality of demultiplex output lines each coupled to a different one of the storage locations of the storage means; and readout means operative to cause the data stored in the storage locations of the storage means to be applied in parallel to the demultiplex output lines.

6. A modular multiplex/demultiplex apparatus in accordance with claim 5 wherein the selection means of each module unit comprises:

circuit means operable to produce a coded signal designating a particular one of the plurality of gating means to be enabled to pass therethrough multiplexed data at the output of the first shift register means and designating a particular one of the plurality of multiplex input lines the multiplexed data on which is to be transferred to the second shift register means;

destination selector means coupled to the circuit means and operative to decode the coded signal produced by the circuit means and to produce a signal for enabling the particular gating means designated by the circuit means; and source selector means coupled to the circuit means and operative in response to the coded signal produced by the circuit means to couple the multiplexed signal on the designated multiplex input line to the second shift register means.

7. A module multiplex/demultiplex apparatus in accordance with claim 6 wherein:

the first shift register means of each module unit further has a clock input for receiving input clock pulses for shifting data applied to the first shift register means to the output of the first shift register means, the input clock pulses being of the same frequency for all first shift register means interconnected serially in a group by means of module interconnection multiplex output lines so that data passes serially through the shift register means of the group; and the second shift register means and counter means of each module unit further have clock inputs for receiving input clock pulses for respectively shifting data along and through the stages of the shift register means and for clocking the counter means in synchronism with the shifting of data along the second shift register means, the input clock signals for the second shift register means and counter means for module units interconnected by means of the aforesaid module interconnection multiplex output lines being of the same frequency as the clock signals applied to the first shift register means.

8. A modular multiplex/demultiplex apparatus in accordance with claim 7 wherein:

the second shift register means of each module unit has a capacity for storing a predetermined number of bits of multiplexed data; and the counter means of the module unit is operative to produce an output count signal when it has counted up to said predetermined number.

9. A modular multiplex/demultiplex apparatus in accordance with claim 8 wherein:

the storage means of each module unit comprises:
first latch register means comprising a plurality of stages each coupled to a corresponding one of the stages of the associated second shift register means, said first latch register means being operative in response to a transfer signal being applied thereto to receive in parallel the data shifted into and stored in the stages of the second shift register means and to store said data in its corresponding stages; and
second latch register means comprising a plurality of stages each coupled to a corresponding one of the stages of the first latch register means; and the readout means of each module unit comprises:
transfer circuit means operative after data has been shifted into the first latch register means of all module units in the series to produce and apply a second transfer signal to the second latch register means;
said second latch register means being operative in response to the second transfer signal to receive in parallel the data stored in the first latch register means and to store said data in the stages thereof.

10. A modular multiplex/demultiplex apparatus in accordance with claim 9 wherein:

the designation means of each module unit includes means coupled to the counter circuit means of the module unit and operative to apply a signal having a first value to the counter circuit means when the counter circuit means is to be first in the series of module units and to apply a signal having a second value to the counter circuit means when the counter circuit means is to be other than the first in the series of module units.

11. A modular multiplex/demultiplex apparatus in accordance with claim 10 wherein the storage means of each module unit further comprises:

third latch register means comprising a plurality of stages each coupled to a corresponding one of the stages of the second latch register means of the module unit and to a corresponding one of the plurality of demultiplex output lines of the module unit, said third latch register means being operative to receive input clock signals and the data stored in the second latch register means and, in response to the input clock signals, to clock the data received thereby to the plurality of demultiplex output lines.

* * * * *